United States Patent [19]

Nohren, Jr.

[11] 4,397,384

[45] Aug. 9, 1983

[54] MANUFACTURING SYSTEM AND TRANSPORT ASSEMBLY

[76] Inventor: John E. Nohren, Jr., 5170 126th Ave. North, Clearwater, Fla. 33520

[21] Appl. No.: 241,425

[22] Filed: Mar. 6, 1981

[51] Int. Cl.$^3$ .............................................. B65G 43/00
[52] U.S. Cl. ................................... 198/341; 198/358; 198/472; 198/339
[58] Field of Search ............... 198/370, 472, 358, 345, 198/350, 339, 362, 570, 580, 852, 367, 372, 742, 341

[56] References Cited

U.S. PATENT DOCUMENTS

| | | |
|---|---|---|
| 1,897,901 | 2/1933 | Hagopian . |
| 2,564,056 | 8/1951 | Fahey . |
| 2,580,229 | 12/1951 | Kendall . |
| 2,695,998 | 12/1954 | Hogan . |
| 3,527,087 | 3/1968 | Converse et al. ............... 198/472 X |
| 3,530,571 | 9/1970 | Perry . |
| 3,543,392 | 12/1970 | Perry et al. ........................... 29/563 |
| 3,640,412 | 2/1972 | Traube . |
| 3,842,962 | 10/1974 | Grachev et al. .................... 198/367 |
| 3,895,671 | 7/1975 | Shiriashi ......................... 198/852 X |
| 4,217,978 | 8/1980 | Stalker ............................ 198/472 X |
| 4,271,957 | 6/1981 | Osborne .......................... 198/742 X |
| 4,302,919 | 12/1981 | Hartness ......................... 198/345 X |

Primary Examiner—Jeffrey V. Nase
Assistant Examiner—Dennis J. Williamson
Attorney, Agent, or Firm—Cushman, Darby & Cushman

[57] ABSTRACT

A system capable of accommodating variations in individual work station operation, and a method of achieving and maintaining a desired predetermined manufacturing system rate utilizing integrated work station and dual conveyors. First and second conveyors are provided adapted to transport pallets thereon, and the conveyors are mounted so that they are generally parallel to and spaced from each other permitting the integration of automatic work stations between the independent conveyor. The conveyors are powered to run in the same direction, pallets being transported by the first conveyor being transported generally parallel to pallets being transported by the second conveyor. Workpiece acting stations are disposed between and extend between the first and second conveyors for acting upon workpieces brought into an dpositioned therein and retained generally in a static mode for the duration of the operation. Structures are provided for moving pallets independently from the first conveyor to a work station and then to the second conveyor or vice-versa. After completion of the desired activity upon each workpiece at a station, the respective pallet is moved from the station unto the opposite conveyor, and the series of activities is repeated for each station set until all desired operations have been completed for each pallet-fixtured workpiece.

16 Claims, 13 Drawing Figures

MANUFACTURING SYSTEM AND TRANSPORT ASSEMBLY

BACKGROUND AND SUMMARY OF THE INVENTION

In manufacturing systems it is of course desirable to achieve production rates which are as high as possible. However, in situations where consecutive operations are to be performed on the workpieces at separate independent machines (stations) requiring the fixturing or re-locating of the workpiece for each consecutive operation each having different station cycle times, it is difficult to achieve and maintain desired high production and efficiency rates. Prior attempts have normally centered around providng a limited number of redundant stations for the stations with long cycle times, however there are economic and severe technological limits on the number of redundant stations that can be utilized to achieve desired high production rates with an integrated system. Also, in prior rate limited systems when breakdowns or station interruptions occur—especially at slower stations—the entire manufacturing operation can be slowed down or brought to a halt.

According to the present invention an integral dual transport assembly, and a method of utilizing same with independent machines or stations, are provided which eliminate most of the problems associaed with prior art conveyorized manufacturing systems or transfer type machines, and permits a predetermined high production rate to be achieved and maintained. In conventional systems redundant stations normally become impractical generally after three independent redundant stations due to added transfer time and requirements to identify processed and to be processed workpieces. However, according to the invention 20 or more redundant stations are easily accommodaed and may be productively balanced with other groupings of redundant or single stations as the operations and station cycle times dictate to achieve desired production rates and system reliability.

According to the present invention, workpieces are mounted on workpiece transport fixtures (hereinafter called "pallets") which pallets have random access to a plurality of common stations with no intermingling of processing, processed, and waiting-to-be processed parts within a common station grouping. There is no need to return through the system prior to reaching the next downstream operation, and maximum flow for the to-be-processed workpieces is achieved, greatly simplifying the memory and/or control system. While not limiting the number of redundant stations as in other systems due to pallet transfer times or the co-mingling of processed and to-be-processed parts.

The assembly and method according to the present invention operate according to an accumulation-in-motion theory; i.e., in the majority of instances pallet accumulation will be live, transferring down the in-feed conveyor in search of an empty station and automatically being directed into such first available station immediately upon arrival at the station. However, should the pallet arrive adjacent to the last station in the series and find it occupied it will simply wait adjacent to the station until that station is available. The pallets may be proportionally retained adjacent to each of the stations rather than being allowed to accumulate at the end station, thus as each station is occupied from the last station in line on back, individual pallets are queued adjacent to a station rather than queuing at the last available station. When the last station or an upstream station accepts the adjacent pallet the other pallets held adjacent to the preceding stations are released, and thus the system has the ability to vary the pallets in static float. This unique feature serves to balance the system and reduce the number of pallets that would otherwise be required, although by the very nature of this system float will be dynamic with static flow coming into play only when normal systems balance has been disturbed or a given series of redundant stations lack the production capability of the other elements making up the system and hence becomes the slowest and controlling operation within the system (e.g., where one or more stations of the series of redundant stations breaks down or functions at reduced efficiency).

The system according to the present invention provides for the conveyance of a plurality of pallets containing workpieces to and between work stations. The system comprises first and second conveyors adapted to workpiece transport and locating pallets thereon, means for mounting the conveyors so that they are generally parallel to and spaced from each other over the working portions thereof, and means for powering the conveyors so that they run in the same direction, workpiece transport and locating pallels supported by the first conveyor running generally parallel to pallets supported by the second conveyor. Pallet locating means integrated with workpiece acting means are generally disposed between and extend between the first and second conveyor for locating the pallet and workpiece and acting upon workpieces brought into contact therewith and means are provided for moving workpiece locating and supporting pallets from the first conveyor to a said workpiece acting means and then to the second conveyor, or vice-versa. The conveyors preferably comprise flat-top plate chain conveyors, although a wide variety of conventional conveyor types may be used. Preferably, pallet stop means are associated with each conveyor on either side of the workpiece acting means. Also pallet locating and clamping means are provided for clamping and locating a pallet in operative association with the workpiece acting means, fluid powered actuating means are provided for effecting actuation of the stop means, clamping means, and pallet moving means; electrically controlled valve means are provided for controlling the fluid powered actuating means; and electric sensing and control means are provided for effecting actuation of the electrically controlled valve means in response to pallet position and condition. Status indicators of any conventional type may be provided on each pallet, including mechanical indicators (movable pins, levers, etc.), magnetic, optical, or electric devices.

According to the method of the present invention it is possible to achieve and maintain a desired predetermined manufacturing system rate utilizing first and second generally parallel conveyors adapted to transport pallets containing workpieces thereon in the same direction, with workpiece acting stations normally disposed between the conveyors. In practicing the method, a plurality of workpiece acting stations are disposed in sets, all stations in each set for performing a given task on the workpieces. The number of stations provided for each set is proportional to the relative amount of time that it takes to do the particular task performed by the stations. Pallets containing workpieces thereon are fed on the first conveyor toward the first set of stations, and each pallet is selectively moved, depending upon station availability, into operative association with a station of the first set by moving the respective pallet off of the first conveyor toward the station. After completion of the desired activity upon each workpiece at a station in the first set, the pallet is moved from the station onto the second conveyor and then transported on the second conveyor toward a second station set. Each pallet is selectively moved into operative association with a station of the second set, depending upon station availability, by moving the respective pallet off of the second conveyor toward the station. After completion of the desired activity upon each workpiece at a station in the second set the respective pallet is moved from the station onto the first conveyor, without regard to the completion of operations at the other stations within the system. A nonconvergent traffic control pallet stop permitting egress of the pallet from the station onto the conveyor may be actuated. Then the sequence of steps is repeated for each station set until all desired operations have been completed for a given pallet mounted workpiece. All of the steps are preferably accomplished automatically, although manual work stations can be interspersed with automatic work stations, and automatic stations (as permitted by cycle requirements) may be on-line with either of the two conveyors.

The condition of each pallet and workpiece is automatically sensed at a plurality of different points for a plurality of different conditions, and upon sensing of a given condition a pallet and/or workpiece on or thereon may be selectively rejected by removing them from the first and second conveyors or simply passed through the system without the performance of additional work. Completed workpieces may also be automatically removed from the conveyors. Under normal operating conditions pallet accumulation at the stations within a set is live, and during abnormal operating conditions the pallets are varied and quyed in static float behind each station of a set of stations. Normally idle back-up work stations may be provided in at least some of the station sets, and brought into operation should a corresponding work station become inoperative to assure maximum efficiency and through put concurrent with a maintenance procedure.

It is the primary object of the present invention to provide a transport assembly for, and method of, achieving and maintaining a desired predetermined manufacturing system production and efficiency rate, which can readily achieve high production capabilities in a simple manner while accommodating a variety of widely differing production and manufacturing requirements. This and other objects of the invention will become clear from an inspection of the detailed description of the invention and from the appended claims.

BRIEF DESCRIPTION OF THE DRAWINGS

FIG. 10a is an electrical wiring diagram schematically illustrating the hook-up of the circuitry of FIG. 9 to a micro-processor or the like;

DETAILED DESCRIPTION OF THE DRAWINGS

Figure 1A:
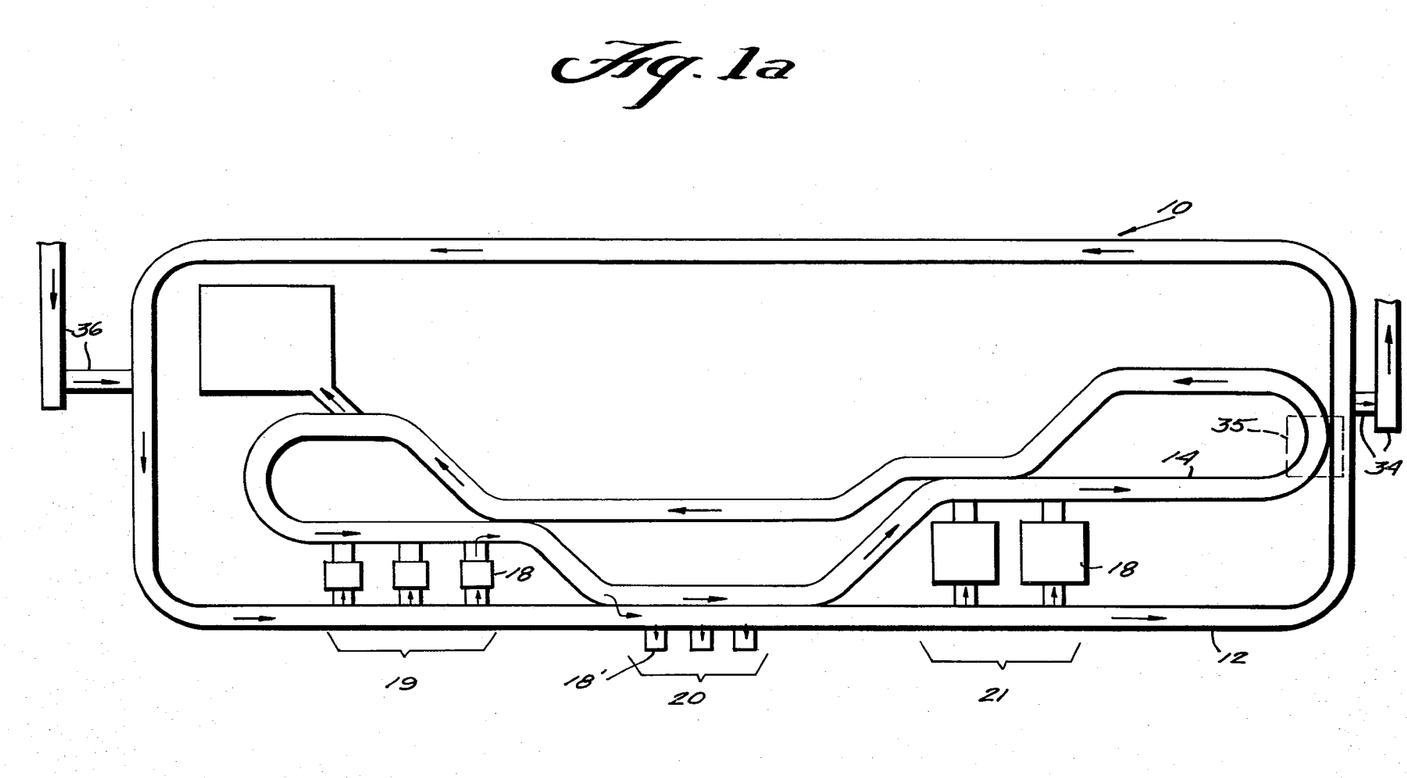
FIGS. 1a and 1b are schematic showings of exemplary transport assemblies according to the present invention.
Figure 1B:
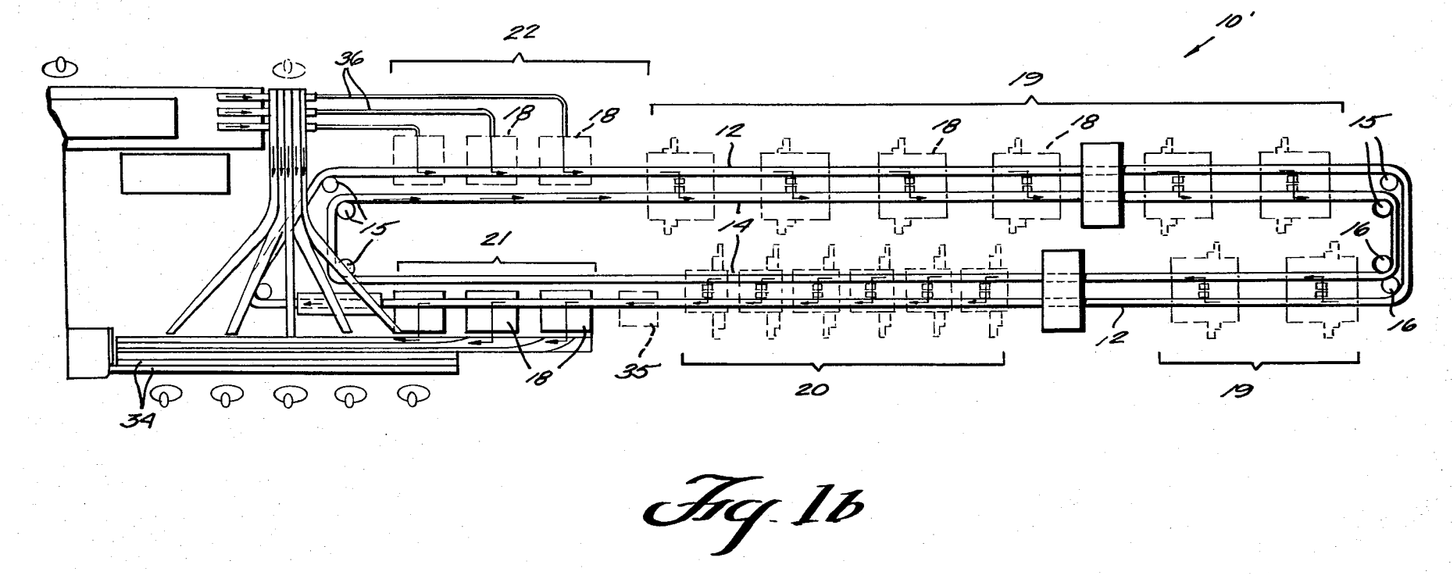

FIG. 1a is a schematic showing of a simple transport assembly 10 according to the invention, and FIG. 1b is a schematic showing of a more complex transport assembly 10' according to the invention. The assemblies 10, 10', include a first conveyor 12 and a second conveyor 14, each adapted to transport pallets P (see the pallet of FIG. 7 for example) thereon. Means, such as rollers 15 and associated conventional frames (see FIG. 1b) are provided for mounting the conveyors 12, 14, so that they are generally parallel to and spaced from each other over the working portions thereof, and means, such as powered roller, gear, or sprocket 16 (see FIG. 1b) are provided for powering the conveyors 12, 14, so that they run in the same direction (as indicated by the arrows in the drawings), pallets P supported by the conveyor 12 running generally parallel to pallets P supported by the conveyor 14.

Workpiece acting means 18 are disposed between and extend between the conveyors 12, 14, for acting upon workpieces brought into contact therewith. Additional workpiece acting means may be disposed in a conveyor line where feasible. The workpiece acting means 18 preferably comprise automatic stations, although manual work stations 18' (see FIG. 1a) also may be provided. The workpiece acting means 18 are provided in sets 19, 20, 21, 22, all the stations in each set for performing a given task on workpieces transported into operative relationship therewith. The number of stations 18 being provided for each set 19, 20, 21, 22, is proportional to the relative amount of time that it takes to do the particular task which those particular work stations perform. The assemblies 10, 10', also includes means 25 (see FIG. 4) for moving pallets P from one conveyor 12, 14, to a workpiece acting means 18 and then to the other conveyor 14, 12.

The conveyor 12, 14, may be of any suitable conventional type that can accomplish the results desired according to the invention.

Figure 2:
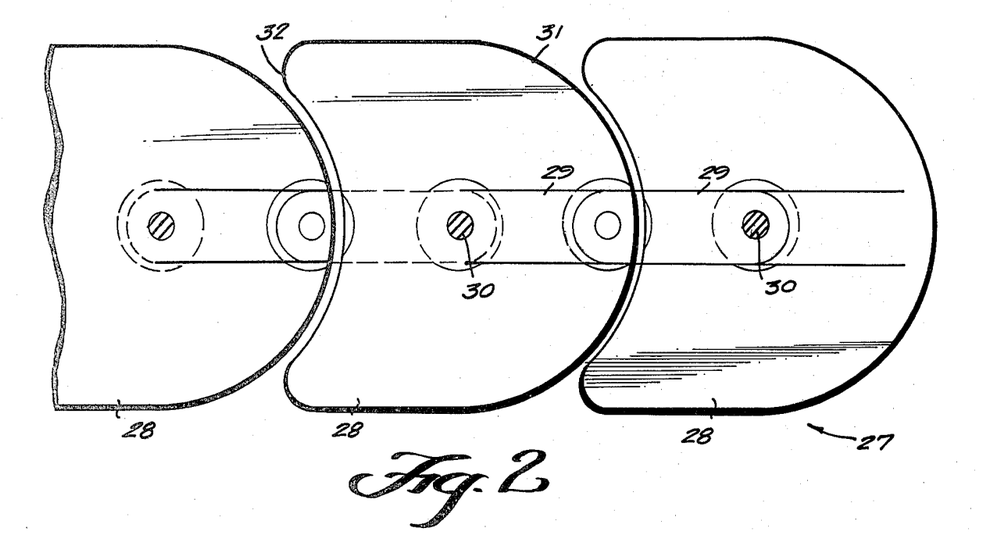
FIGS. 2 and 3 are bottom plan and side views, respectively, of details of an exemplary conveyor utilizable in the systems of FIGS. 1a and 1b.
Figure 3:
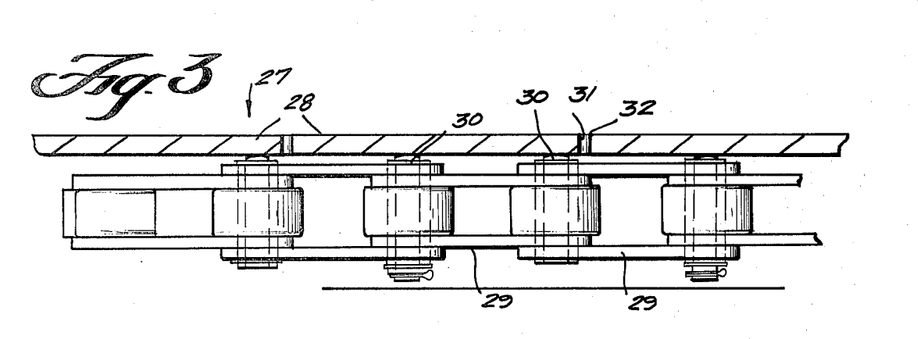

An exemplary type conveyor 12, 14, is a flat top plate chain conveyor, illustrated generally at 27 in FIGS. 2 and 3, and including a series of flat top plates 28 operatively pivotally connected to chain link 29 by pivot shafts 30 or the like. The mating curved front and rear portions 31, 32, of the plates 28, allow the conveyors 27 to move in horizontal curved paths while still properly transporting pallets P thereon. Similarly the system could be adapted to in-line over and under type conveyors if desired.

The workpiece acting stations 18 may comprise any suitable stations for performing the tasks that must be performed on the workpieces mounted by the pallets P. The exact nature of the stations will of course depend upon the particular manufacturing process utilized. Angled ramps (not shown) may be provided for effecting accelerated ingress and/or egress of pallets to and/or from the work stations 18. The work stations may be static or dynamic relative to a pallet P.

One exemplary manufacturing system that could advantageously utilize the conveyor assemblies 10, 10', is a munitions manufacturing system which loads rounds with exact predetermined amounts of powder and seals them. In such a situation—with reference to FIG. 1b—the stations 18 in station set 22 could be empty neigh stations, which would weigh the rounds when empty; the stations 18 in station set 19 could be weigh, fill and tab seal stations; the stations 18 in station set 20 could be tab check stations; the stations 18 of the station set 21 could be weigh, height check, and mark increment stations. In such a situation, preferably three empty weigh stations, 8 weigh, fill and tab seal stations, 6 tab check stations, and 3 weigh, height check and mark increment stations would be provided to proportion the number of stations to the relative amount of time that it takes to do a particular task to be performed by the stations. A complete transport assembly 10 also would, of course, have conveyors 34 for automatically removing completed workpieces from the conveyors 12, 14, a reject pallet (and/or workpiece) removal station 35 with suitable conventional pallet condition sensing means for selectively effecting actuation of the reject pallet removal station 35 upon sensing of a predetermined pallet condition, and feed-in conveyors 36 for feeding in workpieces and/or pallets to be acted upon.

Figures 4, 7, 11:
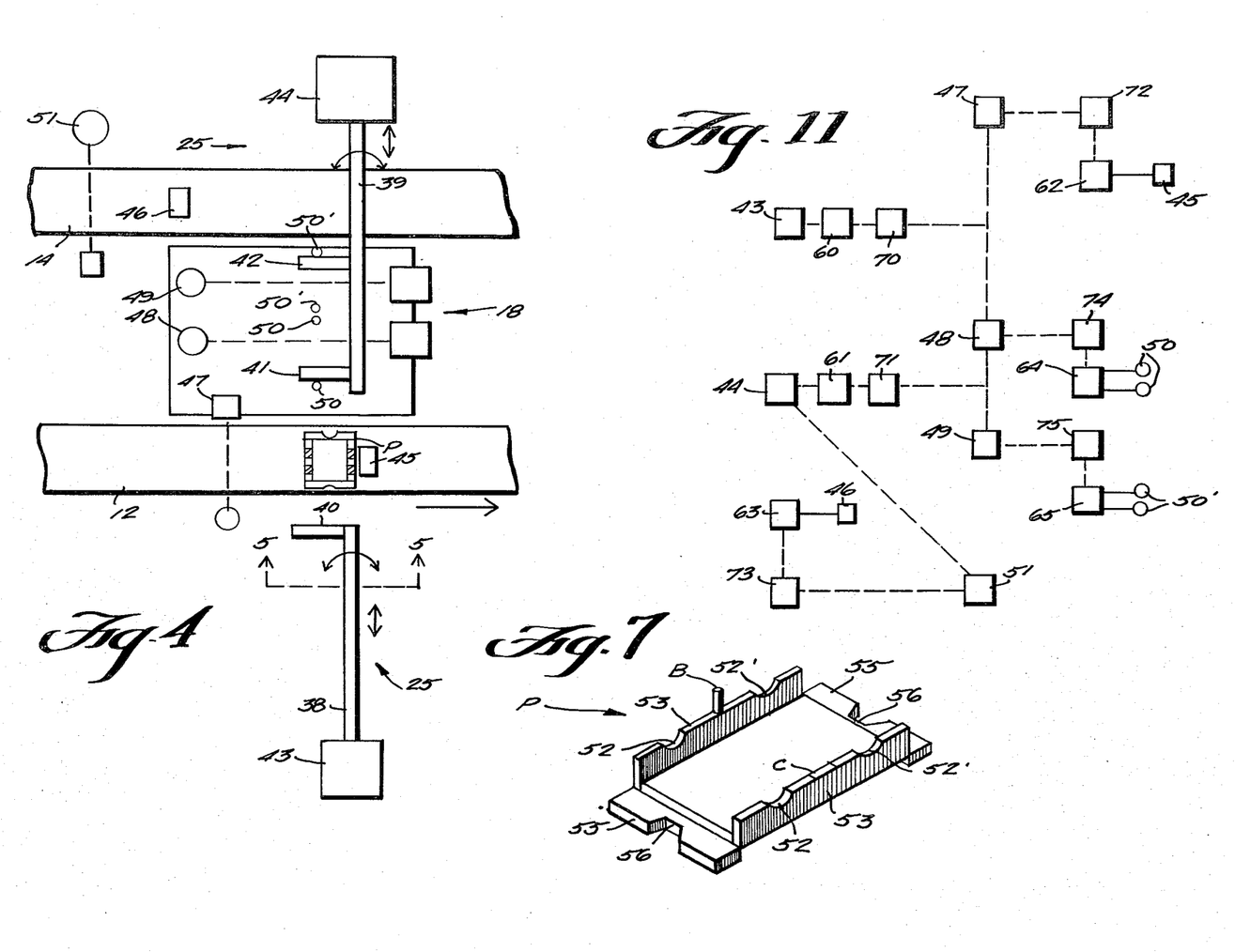
FIG. 4 is a top schematic view of exemplary pallet handling means associated with a work station for use in the conveyor systems of FIGS. 1a and 1b.
FIG. 7 is a perspective view of an exemplary pallet utilizable according to the invention.
FIG. 11 is a schematic showing of the interconnections between various control elements according to the invention.
Figure 5:
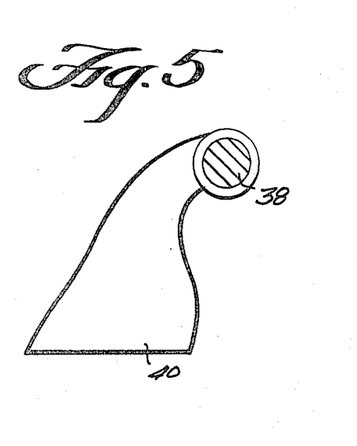
FIG. 5 is a view taken generally along lines 5—5 of FIG. 4 of an actuator element of the FIG. 4 system.
Figure 6:
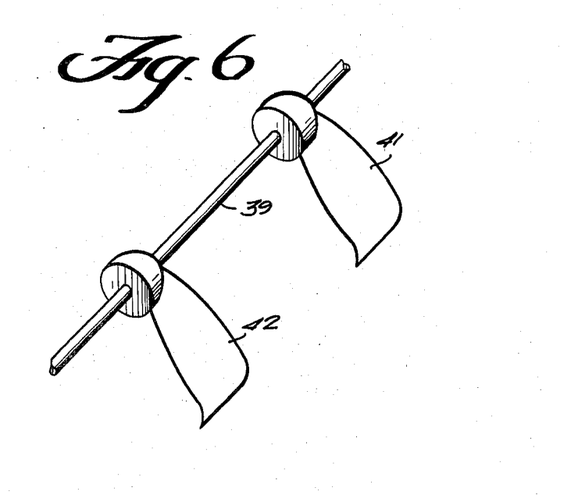
FIG. 6 is a perspective view of another pallet actuator mechanism of the FIG. 4 system.

Exemplary pallet moving means 25 are illustrated clearly in FIGS. 4, 5 and 6. Such means include a pair of reciprocating, rotable shafts 38, 39, each having pallet engaging portions of a given arcuate extent formed thereon, such as the single pallet engaging portion 40 on shaft 38 and a pair of pallet engaging portions 41, 42 on the shaft 39. A suitable power mechanism 43 is provided for reciprocating and rotating the shaft 38, and another such mechanism 44 is provided for reciprocating and rotating the shaft 39. Pallet stop means 45, 46, are associated with the conveyors 12, 14, on either side of the workpiece acting means 18 and suitable remote sensing and control means, such as photocell assemblies 47, 48, and 49 are provided for controlling actuation of the stop means 45, 46, and power means 43, 44. The sensing and control means 47, 48, 49, also control pallet clamping means, such as pins 50, 50', which clamp a pallet P in operative association with the workpiece acting means 18.

An exemplary pallet P is illustrated in FIG. 7 and includes a pair of spaced notch portions 52, 52' formed on sidewalls 53, thereof, which portions 52, 52' are disposed in a straight line generally parallel to the direction of movement of the pallet P on the conveyors 12,14, the notch portions 52, 52' being adapted to receive the pallet engaging portions 40, 41, 42. A flat surface 54 is provided on the pallet P which mounts the workpiece that is being acted upon, and end tabs 55 of the pallet P have notches 56 formed therein for receipt of the pallet locating and clamping pins 50, 50'.

Figure 8:
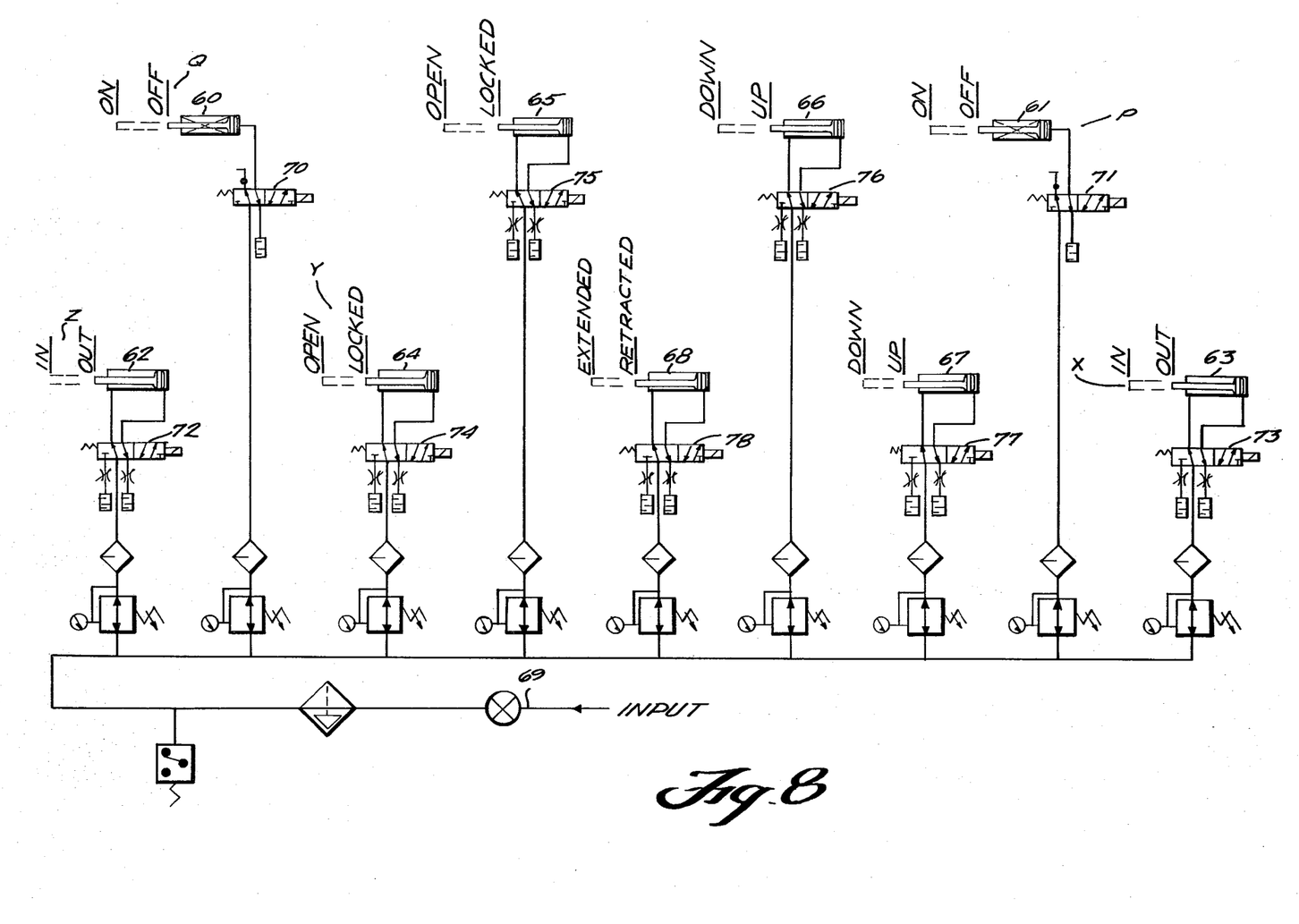
FIG. 8 is a schematic diagram of a fluid power control system utilizable according to the invention.

Fluid powered actuating means are provided for effecting actuation of the stop means 45, 46, clamping and locating means 50, 50' and pallet moving means 38, 39. A fluid schematic illustrating exemplary components utilized in such fluid powered actuating means is shown in FIG. 8. The fluid powered actuating means may include a piston and cylinder arrangement 60 for controlling a reversing clutch for the actuator 43, a piston and cylinder arrangement 61 for controlling a reversing clutch for the mechanism 44, a piston and cylinder 62 for controlling the input conveyor pallet stop 45, a piston and cylinder arrangement 63 for controlling the output conveyor pallet stop 46, a piston and cylinder arrangement 64 for controlling the first clamping pins 50 or functionally equivalent structure, a piston and cylinder arrangement 65 for controlling the second clamping pins 50', and various other piston and cylinder arrangements can be provided such as tab check gauge piston and cylinder 66, a fault check piston and cylinder 78, and a brush piston and cylinder arrangement 68. A common fluid input line 69 may be provided for all of the piston and cylinder arrangements 60–68, and conventional fluid components may be associated with the common input line 69 and all of the branch lines to the piston and cylinder arrangements 60–68, as illustrated in the drawings, all elements being illustrated by conventional symbols.

Each of the piston and cylinder assemblies 60–68 is operated by a solenoid valve, valves 70–78, respectively. FIG. 11 shows a similified schematic represenation of the interconnections between the various photocells illustrated in FIG. 4 and the various solenoid and piston and cylinder controls for moving the pallets P into and out of the work station 18 of FIG. 4. The photocell 51 operates the stop 46 to prevent movement of a pallet on conveyor 14 into interferring relationship with a pallet being moved from station 18 to conveyor 14 by the control mechanism 44.

In moving the pallets P from the conveyor 12 through the station 18 to the conveyor 14, the mechanism illustrated in FIGS. 4–7 operate generally as follows: With the stop 45 holding a pallet P in place ready to be moved into operative association with the station 18, once the station 18 is cleared the mechanism 43 rotates the shaft 38 to rotate portion 40 out of interferring relationship with the pallet P, linearly moves the shaft 38 so that the portion 40 overlays the notches 52 of the pallet P, reciprocates the shaft 38 so that the pallet P is moved in a position to be held by the clamp pins 50, rotates shaft 38 to move the portion 40 out of engagement with the notches 52, and linearly moves the shaft 38 back to its original position. The photocell 48 senses the pallet in position adjacent the clamps 50 and actuates the clamp pins 50 to engage the notched portions 56 of the pallet, holding it in place to be acted upon by a suitable workpiece acting mechanism.

Once the action at the first stage of station 18 is completed, and assuming that the second position is cleared, the clamping pins 50 are released, and the control mechanism 44 rotates the shaft 39 so that the portion 41 thereof engages notches 52' of the pallet P. The shaft 39 is then reciprocated to move the pallet P toward the clamping pins 50', the shaft 39 is rotated so that portion 41 is out of engagement with the notches 52', and the shaft 39 is reciprocated back to its original position. During this movement, the portion 42 is similarly being brought into and out of engagement with notches 52' of a pallet that had been received by the clamping pins 50' and thus moves that pallet onto the conveyor 14 before the portion 42 is moved out of interfering relationship with the notches 52'. The photocell 49 senses the proper positioning of the next pallet in registry with the clamping pins 50' and then actuates those clamping pins 50' to engage the notched portions 56 of that pallet. The entire procedure is continuous, each pallet in turn being moved from the conveyor 12 to the first position in the station 18, to the second position in the station 18, and then to the conveyor 14.

Figure 9:
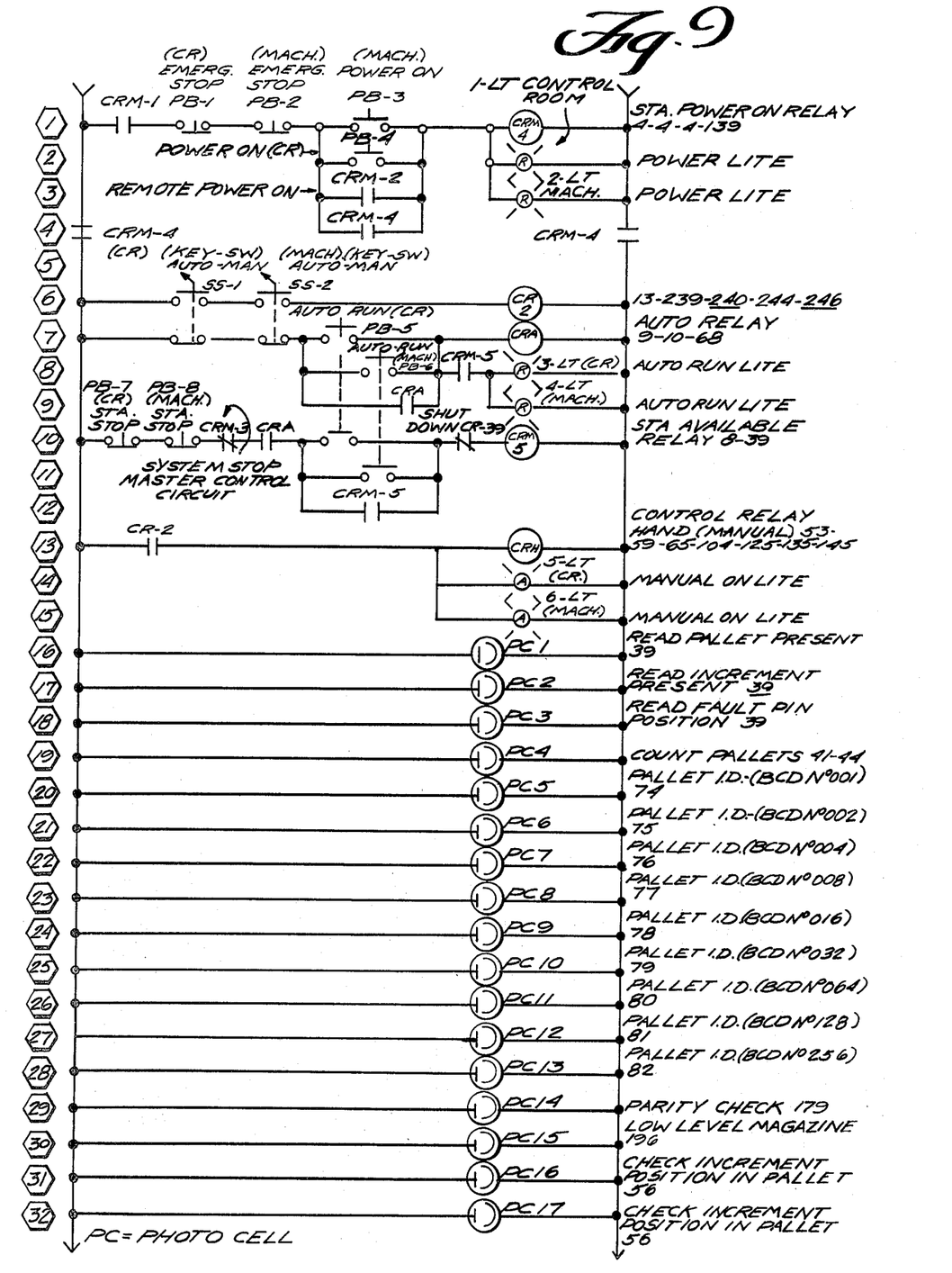
FIG. 9 is a schematic of exemplary electrical controls utilizable with the conveyor system of FIGS. 1a and 1b.
Figure 10A:
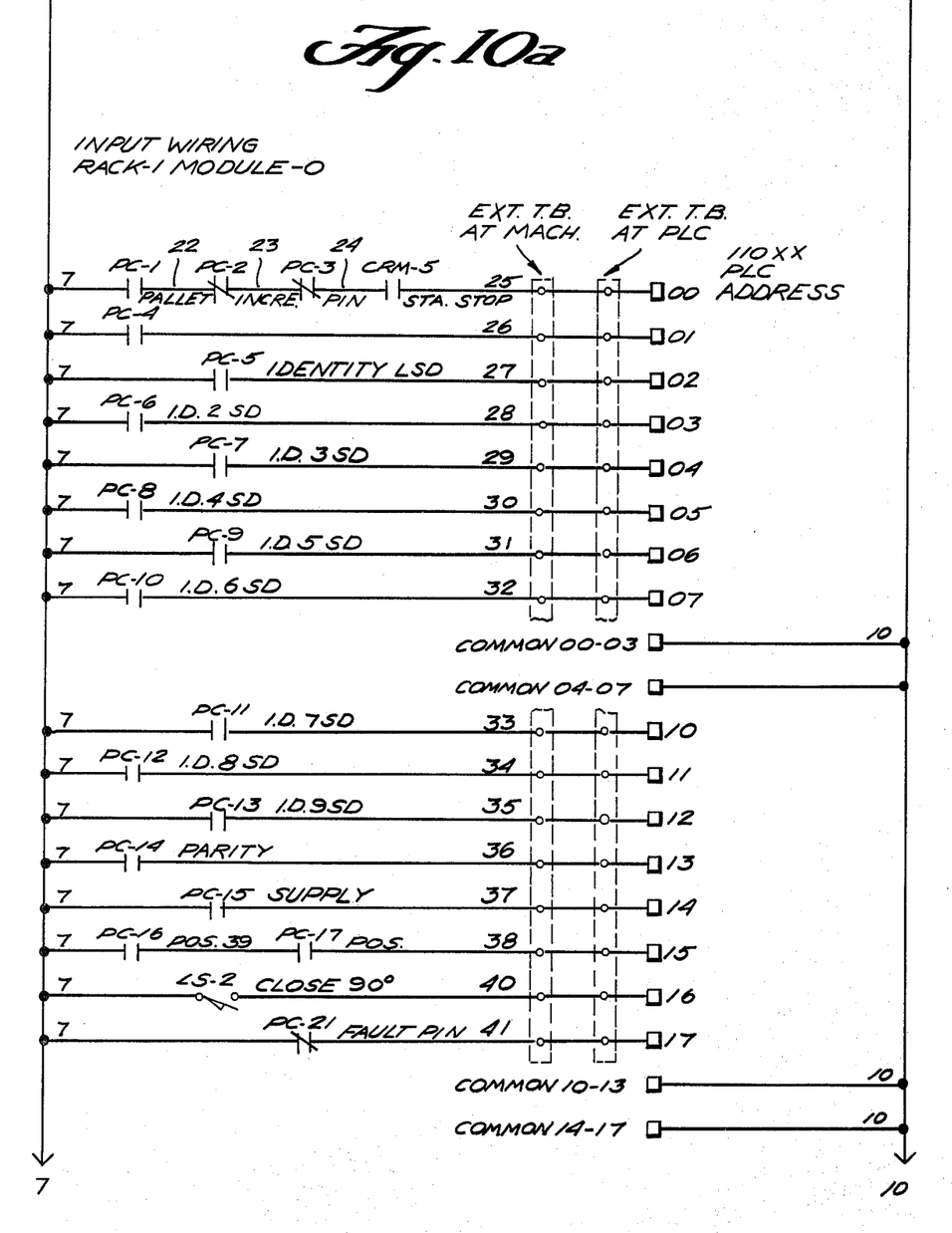
Figure 10B:
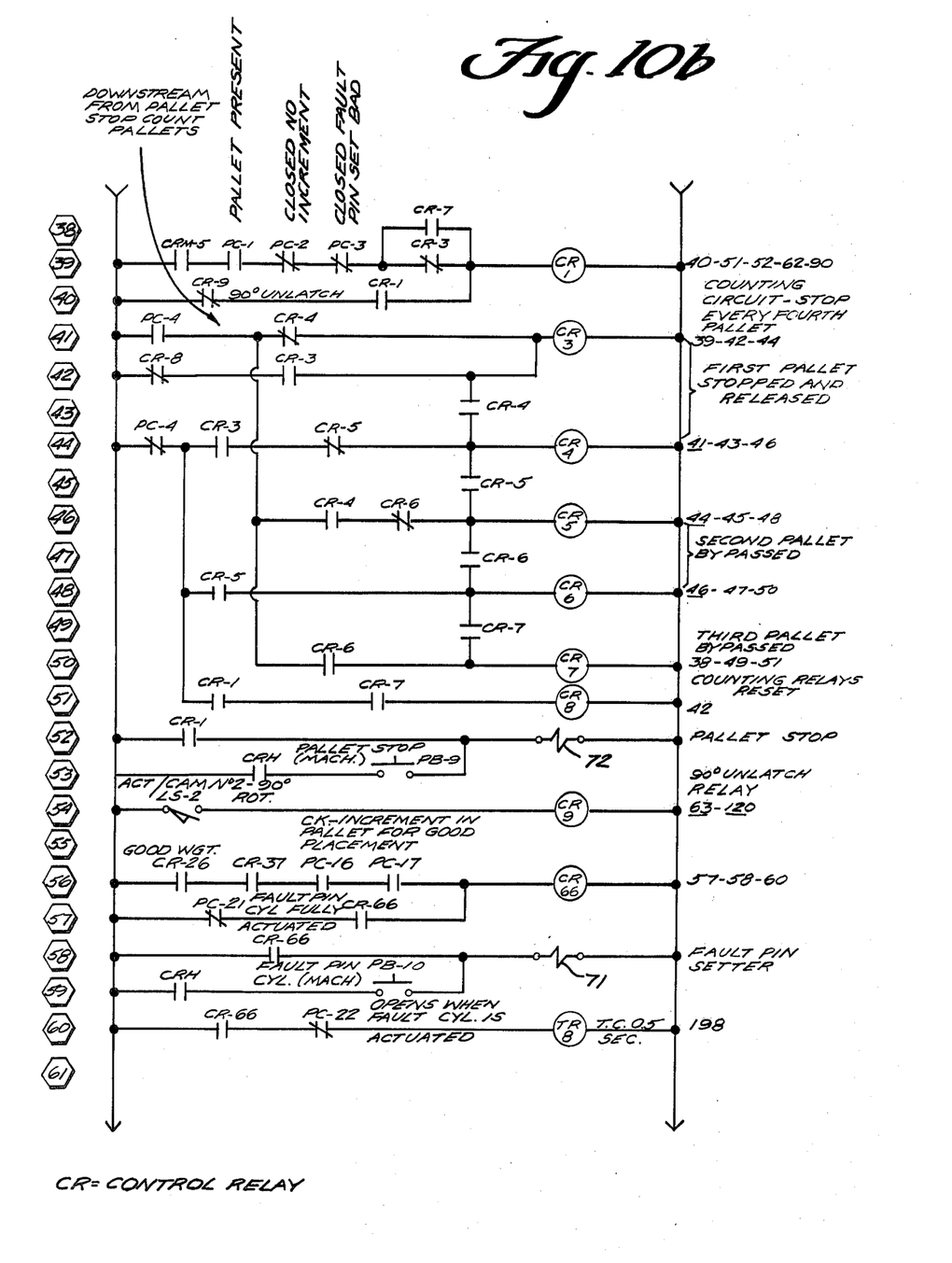
FIG. 10b is a schematic diagram illustrating a relay logic system that may be hooked up to the circuity of FIG. 9.

FIGS. 9, 10a and 10b show more detailed electrical hook-ups that may be utilized in an exemplary system according to the invention. The photocells PC1 through PC17 may be used for all sorts of sensing functions depending upon the particular manufacturing system utilized. For instance PC1 could correspond to photocell 48 and sense that a pallet is present in position, PC2 could sense the presence of an increment (in munitions manufacture) on the pallet, PC3 could read whether or not a fault pin on the pallet had been actuated (which would prevent further actuation at a station 18 which with the photocell was associated), PC4 could count the number of pallets in a row with fault pin indicators, PC4-PC14 could read various identifying features of the pallet to control the exact operation to be provided at the station 18, PC15 would sense the condition of the mechanism at station 18 for acting on the increment in the pallet, and PC16 and PC17 could make sure that the increment was positively properly positioned in the pallet. FIG. 10a illustrates exemplary circuitry for hooking up the circuitry of FIG. 9 to a conventional micro-processor address unit while FIG. 10b illustrates relay logic which may be used instead of the circuitry of FIG. 10a. In FIG. 10b the designation CR indicates a control relay either normally open or normally closed (where a slash extends between the two lines indicating the control relay).

According to the present invention there is provided a method of achieving and maintaining a desired predetermined manufacturing system rate utilizing first and second generally parallel conveyors 12, 14, adapted to transport pallets P containing workpieces thereon in the same direction, with workpiece acting stations 18 disposed between the conveyors. The method comprises the steps of: providing a plurality of workpiece acting stations in sets (19-22), all stations in each set performing a given task on workpieces transported into operative relationship therewith and the number of stations being provided for each set being proportional to the relative amount of time it takes to do that particular task; feeding pallets containing workpieces thereon on the first conveyor 12 toward the first set of stations (19); and selectively moving each pallet, depending upon station availability, into operative association with a station 18 of the first set 19 by moving the respective pallet off of the first conveyor 12 toward the station 18.

After completion of the desired activity upon each workpiece at a station in the first set 19, the method further comprises moving the pallet from the station 18 onto the second conveyor 14, transporting each pallet on the second conveyor 14 to a second station set 20, selectively moving each pallet, depending upon station availability, into operative association with a station of the second set 20 by moving the respective pallet off the second conveyor toward the station; and after completion of the desired activity upon each workpiece at a station in the second set, moving a respective pallet from the station onto the first conveyor 12. This sequence of steps is repeated for each station set until all desired operations have been completed for a given pallet mounted workpiece.

Each of the pallets may be provided with status indicators which are used to determine the status of the work done on the workpiece. Typical status conditions are: work complete, signifying the allocated work done upon the workpiece has been finished; work rejected, signifying that the workpiece is defective, faulted, or incomplete as it leaves a given work station; partial rejection, signifying that some portion of the work done on the workpiece is faulted or defective, even to the point of identifying a particular operation, dimensions, weight, etc., which is defective and which is not; or work incomplete, signifying that all or some portions of the work done on the workpiece is incomplete. The status indicators may provide and store this information with respect to the operation performed at each operational area or each work station. In such cases, the work pallet will have separate status indicators corresponding to each operational area or each work station. These status indicators may comprise any suitable indicating means on the pallet, such as mechanical arrangements (movable pins, levers, etc.), magnetic, optical, or electrical sensing means. For instance, as illustrated in FIG. 7, a pin B may be provided as a status indicator, and/or a magnetic coated strip C.

The operation of the invention will now be described for a particular manufacturing system with particular reference to the conveyor assembly 10' of FIG. 1b. Workpieces are transported by input conveyors 36 to the first weigh stations (22) after which they are disposed on pallets P on first conveyor 12. They travel on first conveyor 12 to the first set of stations 19, random access being provided to the plurality of common stations 18 of the set 19. Under normal circumstances, a station 18 will normally be available to the pallet, and the pallet will go on conveyor 12 until it reaches the first available station 18 of the first set 19, being sensed at that station by a photocell 47 or the like, the input stop 45 being actuated to stop the pallet, and the control 43 being actuated to move the pallet from the first conveyor 12 into the station 18 into operative association with the clamping pins 50. However, should the pallet arrive adjacent to the last station 18 of the set 19 and find it occupied, it will await adjacent to that station until the station is available.

Pallets are retained adjacent to each of the stations rather than being allowed to accumulate at the end station of each set thus as each station is occupied from the last station in line on back, individual pallets are queued adjacent to a station rather than queuing at the last available station. When the last station accepts the adjacent pallet, the other pallets held adjacent to the preceding stations are then released; this results in the ability to vary the pallets in static float behind each station. Thus, important avantages of the invention are that under normal operating conditions, pallet accumulation at stations within a set is live, and during normal operating conditions the pallets are varied in static float behind each station of a set of stations.

As each pallet is moved into a station 18 of the station sets 19, it is held in place by the clamping means (e.g. pins 50, 50'), and it is acted upon at that station 18. Its condition and position before and after acting are sensed by photocells or the like, and if the sensing indicates that the workpiece or a pallet is defective, a status indicator B, C, or the like, is acted upon to indicate the status of the pallet and workpiece. Ultimately, once the pallet has been treated at the station 18 of the first set 19 it is moved onto the conveyor 14 by the control mechanism 44, passes conveyor 14 to the next station set 20 wherein similar pallet accumulation occurs, passes through the stations 18 of the set 20 onto the first conveyor 12, and then passes along conveyor 12 to the next set 21 of stations 18. Between stations sets 20 and 21 it passes through a reject station 35 which senses the conditions of the status indicators B, C, or the like, and automatically removes the workpiece (and perhaps the pallet) from the conveyor 12 if a reject status is indicated on the pallet. When treatment at the station 18 of set 21 is complete, the workpieces are then transferred onto the output conveyor 34 for ultimate packaging, inspection, or other activities.

Under some circumstances, where a particular condition of the pallet is sensed, it can be remedied, remedial action can be taken at a station 18 to correct the unacceptable condition before the pallet is further acted upon. Additionally, reserve work stations can be provided in at least some of the station sets, and a reserve work station can be brought into operation should a corresponding work station in that set become inoperative. Also, pallet accumulation before a given station set can be sensed and should the accumulation continue beyond a predetermined level, the entire manufacturing system can be shut down.

It will thus be seen that according to the present invention an assembly and method have been provided which allow a desired predetermined manufacturing system rate to be achieved and maintained, and which is not sensitive to break downs of individual stations. That invention is practiced without intermingling of processed and waiting to be processed parts within a common station group, and high rates of production can be achieved thereby. While the invention has been herein shown and described in what is presently conceived to be a practical and preferred embodiment thereof, it will be apparent to those of ordinary skill in the art that many modifications may be made thereof within the scope of the invention, which scope is to be accorded the broadest interpretation of the appended claims so as to encompass all equivalent assemblies and methods.

What is claimed is:

1. A method of achieving and maintaining a desired predetermined manufacturing system rate utilizing first and second generally parallel conveyors adapted to transport pallets containing workpieces thereon in the same direction, with workpiece acting stations disposed between the conveyors, such system capable of accommodating variations in pallet availability and station cycle interruption and rate, said method comprising the steps of:
    (a) providing a plurality of workpiece acting stations in sets, all stations in each set for performing a given task on workpieces transported into operative relationship therewith, the number of stations being provided for each set being proportional to the relative amount of time that it takes to do that particular task;
    (b) disposing the workpieces on the pallet;
    (c) feeding pallets containing workpieces thereon on the first conveyor toward a first set of stations;
    (d) selectively moving each pallet, depending upon station availability, into operative association with a station of the first set by moving the respective pallet off of the first conveyor toward the station;
    (e) after completion of the desired activity upon each workpiece at a station in the first set, upon each workpiece at a station in the moving the pallet from the station onto the second conveyor;
    (f) transporting each pallet on the second conveyor toward a second station set;
    (g) selectively moving each pallet, depending upon station availability, into operative association with a station of the second set by moving the respective pallet off of the second conveyor toward the station;
    (h) after completion of the desired activity upon the workpiece at a station in the second set, moving the respective pallet from the station onto the first conveyor;
    (i) repeating steps (b)–(g) for each station set until all desired operations have been completed for a given pallet mounted workpiece.

2. A method as recited in claim 1 wherein steps (d), (e), (g) and (h) are accomplished automatically.

3. A method as recited in claim 2 wherein said automatic practice of steps (d), (e), (g), and (h) is accomplished utilizing linearly movable elements, including automatic stops and linear actuators.

4. A method as recited in claim 1 wherein said method steps are practiced substantially continuously, even should a given workpiece acting station break down.

5. A method as recited in claim 1 comprising the further steps of automatically sensing the condition of each pallet and workpiece at a plurality of different points for a plurality of different conditions, and selectively rejecting a pallet and workpiece upon sensing of a given condition.

6. A method as recited in claim 5 comprising the further step of selectively taking remedial action to correct a sensed condition upon sensing of a given condition.

7. A method as recited in claim 1 wherein at least one of said workpiece acting stations is a manual station.

8. A method as recited in claim 1 comprising the further step of automatically removing completed workpieces from the first and second conveyors.

9. A method as recited in claim 1 wherein under normal operating conditions pallet accumulation at stations within a set is live.

10. A method as recited in claim 9 wherein during abnormal operating conditions the pallets are varied in static float behind each station of a set of stations.

11. A method as recited in claim 10 comprising the further step of automatically shutting the manufacturing system down should pallet accumulation continue beyond a predetermined level.

12. A method as recited in claim 10 comprising the further step of automatically shutting a station down due to repetitive rejects after the station.

13. A method as recited in claim 1 comprising the further step of providing reserve work stations in at least some of the station sets, and bridging a reserve work station into operation should a corresponding work station become inoperative.

14. A method as recited in claim 1 comprising the further step of, after step (h), actuating a non-convergent traffic control pallet stop permitting egress of the pallet from the station onto a conveyor.

15. A method as recited in claim 1 wherein step (h) is practiced without regard to the completion of operations at other stations within the system.

16. A method as recited in claim 1 comprising the further step of, between steps (d) and (e), locating and clamping each pallet within a work station to locate the workpieces relative to the station tooling.

* * * * *